(12) United States Patent
Zaouter et al.

(10) Patent No.: US 8,582,200 B2
(45) Date of Patent: Nov. 12, 2013

(54) FIBER CHIRPED PULSE AMPLIFIER WITH NONLINEAR COMPENSATION

(75) Inventors: Yoann Zaouter, Paris (FR); Eric Mottay, Begles (FR)

(73) Assignee: Amplitude Systemes, Pessac (FR)

( * ) Notice: Subject to any disclaimer, the term of this patent is extended or adjusted under 35 U.S.C. 154(b) by 604 days.

(21) Appl. No.: 12/812,762

(22) PCT Filed: Jan. 15, 2009

(86) PCT No.: PCT/FR2009/050056
§ 371 (c)(1),
(2), (4) Date: Jul. 14, 2010

(87) PCT Pub. No.: WO2009/092967
PCT Pub. Date: Jul. 30, 2009

(65) Prior Publication Data
US 2010/0309545 A1 Dec. 9, 2010

(30) Foreign Application Priority Data
Jan. 16, 2008 (FR) ...................................... 08 50269

(51) Int. Cl.
*H01S 3/10* (2006.01)
*H01S 3/23* (2006.01)
(52) U.S. Cl.
USPC ........................................ 359/333; 359/337.5
(58) Field of Classification Search
USPC ........................ 359/333, 337, 337.5, 33, 7.5
See application file for complete search history.

(56) References Cited

U.S. PATENT DOCUMENTS

| | | | | |
|---|---|---|---|---|
| 6,917,631 | B2* | 7/2005 | Richardson et al. | 372/5 |
| 7,782,912 | B2* | 8/2010 | Harter et al. | 372/6 |
| 2012/0120971 | A1* | 5/2012 | Harter et al. | 372/18 |
| 2012/0300798 | A1* | 11/2012 | Harter | 372/6 |

OTHER PUBLICATIONS

Kane S et al: "Grism-pair stretcher-compressor system for simultaneous second- and third-order dispersion compensation in chirped-pulse amplification" Journal of the Optical Society of America B (Optical Physics) Opt. Soc. America USA, Mar. 1997, pp. 661-665, vol. 14, No. 3, XP002492617.

White We et al: "Compensation of Higher-Order Frequency-Dependent Phase Terms in Chirped-Pulse Amplification Systems" Optics Letters, OSA, Optical Society of America, Aug. 15, 1993, pp. 1343-1345, vol. 18, No. 16, Washington, DC, US, XP000384367.

(Continued)

*Primary Examiner* — Mark Hellner
(74) *Attorney, Agent, or Firm* — Young & Thompson (57) ABSTRACT

A chirped pulse fiber amplifier with nonlinear compensation, includes elements for generating a light pulse having an initial peak-power $P_0$ and an initial duration T, a stretcher including at least one optical diffraction network having a line density higher than 1200 lines/mm and suitable for time-stretching the pulse and of inserting a time asymmetry in the stretched pulse, an amplifying fiber including a doped optical fiber section coupled with an optical pumping element and suitable for amplifying the stretched pulse for producing a pulse having a power, a compressor with optical diffraction grating suitable for time-compressing the amplified pulse so that the stretcher and the compressor are mismatched, the mismatch between the stretcher and the compressor being suitable for simultaneously compensating the second- and third-order nonlinear dispersions in the amplifying fiber during the propagation of a pulse having an initial power $P_0$ through the chirped pulse amplifier.

20 Claims, 3 Drawing Sheets

(56) References Cited

OTHER PUBLICATIONS

Sullivan A et al: "Phase Control for Production of High-Fidelity Optical Pulses for Chirped-Pulse Amplification" Optics Letters, OSA, Optical Society of America, Jan. 15, 1995, pp. 192-194, vol. 20, No. 2, Washington, DC, US, XP000486645.
Kane S et al: "Grating Compensation of Third-Order Material Dispersion in the Normal Dispersion Regime: Sub-100-FS Chirped-Pulse Amplification Using a Fiber Stretcher and Grating-Pair Compressor" IEEE Journal of Quantum Electronics, IEEE Service Center, Nov. 1, 1995, pp. 2052-2057, vol. 31, No. 11, Piscataway, NJ, XP000541548.
Miklos Stern et al: "Grating Compensation of Third-Order Fiber Dispersion" IEEE Journal of Quantum Electronics, IEEE Service Center, Dec. 1, 1992, pp. 2742-2748, vol. 28, No. 12, Piscataway, NJ, XP000315276.
Fork R L et al: "Compression of Optical Pulses to Six Femtoseconds by Using Cubic Phase Compensation" Optics Letters, OSA, Optical Society of America, Jul. 1, 1987, pp. 483-485 vol. 12, No. 7, Washington, DC, US, XP000710543.
Lemoff Beet al: "Cubic-Phase-Free Dispersion Compensation in Solid-State Ultrashort-Pulse Lasers" Optics Letters, OSA, Optical Society of America, Jan. 1, 1993, pp. 57-59, vol. 18, No. 1, Washington, DC, US, XP000328277.
Lemoff Beet al: "Quintic-Phase-Limited, Spatially Uniform Expansion and Recompression of Ultrashort Optical Pulses" Optics Letters, OSA, Optical Society of America, Oct. 1, 1993, pp. 1651-1653, vol. 18, No. 19, Washington, DC, US, XP000396952.
Strickland et al: "Compression of amplified chirped optical pulses" Optics Communications, North-Holland Publishing Co. Dec. 1, 1985, pp. 219-221, vol. 56, No. 3, Amsterdam, NL, XP022570804.
Liu Z et al: "High energy fiber chirped pulse amplification system based on cubicons" Lasers and Electro-Optics, 2005. (CLEO), Conference on Baltimore, MD, USA May 22, 2005, pp. 1650-1652 vol. 3, Piscataway, NJ, USA,IEEE, XP010B76993.
Shah L et al: "High energy femtosecond Yb cubicon fiber amplifier" Optics Express Opt. Soc. America USA, Jun. 13, 2005, vol. 13, No. 12, XP002492618.
Zhou Setal: "Compensation of nonlinear phase shifts with third-order dispersion in short-pulse fiber amplifiers", Optics Express Opt. Soc. America USA, Jun. 27, 2005, vol. 13, No. 13, XP002492619.
Kuznetsova L et al: "Scaling of femtosecond Yb-doped fiber- amplifiers to tens of microjoule pulse energy via nonlinear chirped pulse amplification" Optics Letters Optical Society of America USA, Jul. 15, 2007, pp. 2671-2673, vol. 32, No. 18, XP002492620.
Chong A et al: "Theoretical optimization of nonlinear chirped-pulse fiber amplifiers", Journal of the Optical Society of America B (Optical Physics) Opt. Soc. America USA, Aug. 2007, pp. 1815-1823, vol. 24, No. 8, XP002492621.
Zaouter Y et al: "Third-order spectral phase compensation in parabolic pulse compression" CLEO/Europe -IQEC 2007, European Conference on Lasers and Electro-Optics and the International Quantum Electronics Conference IEEE Piscataway, NJ, USA, 2007, p. 681, XP002492622.
Papadopoulos DN et al: "Generation of 63 fs 4.1 MW peak power pulses from a parabolic fiber amplifier operated beyond the gain bandwidth limit", Optics Letters Optical Society of America USA, Sep. 1, 2007, pp. 2520-2522, vol. 32, No. 17, XP002492626.
Zaouter Y et al: "Stretcher-free high energy nonlinear amplification of femtosecond pulses in rod-type fibers" Optics Letters Optical Society of America USA, Jan. 15, 2008, pp. 107-109, vol. 33, No. 2, XP002492627.
International Search Report in Corresponding Application No. PCT/FR2009/050056 Dated Jul. 28, 2009.

\* cited by examiner

FIBER CHIRPED PULSE AMPLIFIER WITH NONLINEAR COMPENSATION

The present invention relates to a source of high-energy ultrashort light pulses.

More particularly, the invention relates to a nonlinear fiber chirped pulse amplifier.

Ytterbium-doped optical fibers are widely used in ultrashort pulse light sources. They offer many advantages for generating and amplifying ultrashort light pulses, and have become an attractive alternative to the conventional laser systems. In particular, they have shown excellent thermo-optical properties, a wide gain spectral bandwidth (>40 nm), a high saturation fluence (the energy divided by the surface area), allowing the generation of millijoule-energy pulses, and a high optical pumping efficiency (>80%).

On the other hand, confinement of the light in core of the optical fiber, associated with long propagation lengths, favours the nonlinear effects that deteriorate the light pulses. More precisely, a nonlinear phase accumulates during the propagation of high-power light pulses, and this nonlinear phase gives rise to a phenomenon of self-phase modulation that modifies the shape of the light pulses. Moreover, it is known that the amplitude of these nonlinear effects becomes larger as the peak-power of the pulses increases (i.e. their energy increases and/or their duration decreases). This explains the energy limitations of the prior-art sources of high-energy ultrashort light pulses.

A first approach for limiting these nonlinear effects consists in distributing the energy of the light pulses by applying a spatial and/or temporal stretching so that the propagation of the light pulses in the amplifying optical fiber occurs in a linear regime.

The first solution is to distribute in space the optical intensity of the light pulses, using monomode fibers of large effective surface area, such as dual-clad fibers, large mode area photonic crystal fibers, or rod-type specific photonic fibers (cf. [1] J. Limpert et al. "High-power rod-type photonic crystal fiber laser", Opt. Express 13, 1055-1058 (2005)). The French patent application N° 0550344 also describes a composite optical fiber for a pump and laser waves confinement laser system.

This solution is associated with a technique of temporal stretching that consists in temporally stretching the light pulses by means of a dispersive optical system, which permits the light-pulse peak-power to be reduced, so that the amplifier may be used in linear regime. After the amplification, the light pulse is recompressed by means of a dispersive optical system symmetric with the stretcher ([2] D. Strickland et al. "Compression of amplified chirped optical pulses", Opt. Comm. 56, 219-221 (1985)). This technique is called "Chirped Pulse amplification" (i.e. CPA for "Chirped Pulse Amplification").

The chirped pulse amplifier (CPA) systems generally comprise the following components:
 a stretcher, comprising a dispersive optical component,
 an amplifying medium, comprising an amplifying optical fiber section, and
 a compressor, comprising a dispersive optical component.

The stretcher provides a temporal stretching of the light pulse, before the amplification thereof. The amplifying fiber can then amplify the stretched pulse in a linear regime. The amplified light pulses are then compressed by a second dispersive optical system, called a compressor. The compressor introduces a dispersion exactly opposed to that of the stretcher, which provides a temporal compression of the amplified light pulse, ideally recompressed to its initial duration.

The dispersive optical components used in the stretchers and compressors may be an optical diffraction grating, a prism, a volume diffraction grating or an optical fiber section. A combination of several of these dispersive optical components may also be used, such as a pair of diffraction gratings, or a grism, i.e. the combination of diffraction gratings and prisms.

The prior art compressors are always based on diffraction gratings, because these solid-state components better support the high energy of the amplified pulses. The prior art stretchers are generally optical fiber stretchers, which permit an easy alignment with the amplifying fiber.

In these linear chirped pulse amplification systems, the design aims to limit the nonlinear phase to as low as possible (often lower than 1). Using this linear chirped pulse amplification technique within the framework of optical fiber amplifiers has permitted the generation of subpicosecond light pulses with an energy of the millijoule order and the generation of femtosecond light pulses with a high mean-power (of the order of one hundred Watts). However, in these systems, the limitation of the nonlinear phase is obtained by very high factors of stretching, which creates a significantly bulky stretcher.

However, there exists a need for compact sources of ultrashort light pulses, having greater values of energy, peak-power and mean-power. Then, it becomes difficult to avoid the nonlinear effects that occur during the propagation of the light pulses in the amplification system.

A second approach consists in using a Chirped Pulse amplifier (CPA) in a nonlinear regime and exploiting optimally the higher-order nonlinear effects of the various components of the CPA, in order to obtain high-power ultrashort pulses.

The second and third-order nonlinear effects accumulate during the propagation of the light pulses through the various components of a chirped pulse amplifier system and can have several origins:
 a nonlinear phase shift $\phi$, of second and third order,
 a group-velocity dispersion ($V_G$), or second order dispersion,
 a third-order dispersion (TOD).

Various publications have tried to define systems that permit to compensate the dominant nonlinear effects.

A first way to compensate some nonlinear effects consists in using a so-called Cubicon pulse with an asymmetric spectral profile (obtained by a spectral filtering) in a CPA comprising an optical fiber stretcher and a diffraction grating compressor. However, the filtering operation induces a loss of spectral bandwidth and limits the maximal compression of the pulses of the order of 500 fs at the CPA output. See the publications [3] Z. Liu et al. "High Energy Fiber Chirped Pulse Amplification System based on Cubicons", in *Conference on Lasers and Electro-Optics/Quantum Electronics and Laser Science and Photonic Applications Systems Technologies*, Technical Digest (CD), Optical Society of America, 2005, paper CThG4, and [4] L. Shah et al. "High energy femtosecond Yb cubicon fiber amplifier", Opt. Express 13, 4717-4722 (2005)).

Another solution does not require any initial pulse of asymmetric spectral shape.

See the following publications:

[5] S. Zhou et al. "Compensation of nonlinear phase shifts with third-order dispersion in short-pulse fiber amplifiers", Opt. Express 13, 4869-4877 (2005),

[6] L. Kuznetsova et al. "Scaling of femtosecond Yb-doped fiber amplifiers to tens of microjoule pulse energy via nonlinear chirped pulse amplification", Opt. Lett. 32, 2671-2673 (2007), and

[7] A. Chong et al. "Theoretical optimization of nonlinear chirped-pulse fiber amplifier", J. Opt. Soc. Am. B24, 1815-1823 (2007).

The publication [5] substantially describes a fiber stretcher-grating compressor configuration, in which the second and third-order nonlinearities in the fiber compensate those of a fiber stretcher (of 400 m long) and a diffraction grating compressor. But, to obtain such compensation, the operating point used (maximizing the peak-power) corresponds to a very high nonlinear phase ($17\pi$) in the amplifying fiber.

However, a high nonlinear phase in the amplifying fiber corresponds to a propagation mode that is probably very close to the threshold beyond which other nonlinear effects, such as nonlinear Raman effects, become predominant and absorb the greatest part of the energy of the pulse. The optical fiber amplifier becomes difficult to use in these conditions. Further, it is difficult to consider the use of a system based on this structure at higher energies, because it would require a longer length of fiber for the stretching, inducing an even higher nonlinear phase, and more disturbing Raman effects. Accordingly, this device seems to be energy-limited.

Finally, a third approach consists in using a parabolic propagation regime in the amplifying fiber, without preliminary stretching the light pulse to compensate for the third-order spectral phase ([7] Y. Zaouter et al. "Third-order spectral phase compensation in parabolic pulse compression", Opt. Express 15, 9372-9377 (2007)). The system described in [7] comprises an oscillator directly coupled (without stretcher) to a fiber amplifier and a compressor. The parameters of the fiber amplifier are adjusted (energy and duration of the input pulses, dispersion, gain, length and nonlinear parameter of the fiber) to obtain a convergence of the input pulses toward a parabolic profile. The compressor placed at the output of the amplifying fiber permits the compensation of the linear frequency drift acquired during the propagation of the light pulse.

However, this solution of parabolic propagation is experimentally limited by additional parasitic effects, such as finite gain bandwidth of the amplifying medium, or higher order nonlinear dispersion effects.

Other experiences (D. Papadopoulos, Y. Zaouter, M. Hanna, F. Druon, E. Mottay, E. Cormier and P. Georges, "Generation of 63 fs 4.1 MW peak power pulses from a parabolic fiber amplifier operated beyond the gain bandwidth limit", Opt. Lett. 32, 2520-2522 (2007) and Y. Zaouter, D. N. Papadopoulos, M. Hanna, J. Boullet, L. Huang, C. Aguergaray, F. Druon, E. Mottay, P. Georges and E. Cormier, "Stretcher-free high energy nonlinear amplification of femtosecond pulses in rod-type fibers", Opt. Lett. 33, 107-109 (2008)) have also shown that the use of fiber amplifiers directly injected by ultrashort pulses slightly or strongly outside the optimal conditions to obtain parabolic pulses also permits the generation of good-quality pulses.

However, these experiences have shown energy limits beyond which the higher-order nonlinear effects are strongly harmful to the pulse quality. The maximal energy of the prior art is thus limited to a few microjoules ($\mu J$).

The patent application FR0755798 also describes a source of high-energy ultrashort light pulses.

Accordingly, the object of the present invention is to propose a source of ultrashort light pulses with Chirped Pulse and second and third-order nonlinear compensation for subpicosecond pulses, having high peak-power and mean-power, and an energy that can reach a few microjoules.

The range of operating values of an amplifier according to the invention is the following:

peak-power of 10 MW to a few GW;
mean-power of 1 W to 1 kW;
output pulse duration of 100 fs to 1 ps;
spatial quality of the pulses: monomode $TEM_{00}$.

The phase shift of a monochromatic wave of pulsation $\omega$ after having passed through a dispersive medium of index $n(\omega)$ and length L is characterized by the value:

$$\Phi(\omega) = \beta(\omega) \cdot L = n(\omega) \cdot \frac{\omega}{c} L \quad (1.1)$$

where c is the speed of light in vacuum.

The parameter $\beta(\omega)$ may be decomposed into a Taylor series, as follows:

$$\beta(\omega) = n(\omega) \cdot \frac{\omega}{c} = \quad (1.2)$$
$$\beta_0 + \beta_1 \cdot (\omega - \omega_0) + \frac{1}{2}\beta_2 \cdot (\omega - \omega_0)^2 + \frac{1}{6}\beta_3 \cdot (\omega - \omega_0)^3 + \dots$$

with $$\beta_1 = \frac{d\beta(\omega)}{d\omega}, \quad \beta_2 = \frac{d^2\beta(\omega)}{d\omega^2}, \quad \beta_3 = \frac{d^3\beta(\omega)}{d\omega^3}, \dots \quad (1.3)$$

$\beta_1$ is the velocity of propagation of the pulse envelope, $\beta_2$ is the group-velocity dispersion, and $\beta_3$ is the third-order dispersion or TOD (Third-order dispersion).

An ultrashort pulse cannot be considered as being strictly monochromatic. Indeed, the pulse duration is linked to the spectral width, by the following relation:

$$\Delta\tau \cdot \Delta\nu > k \quad (1.4)$$

where $\Delta\tau$ is the temporal width of the pulse, $\Delta\nu$ the spectral width thereof, and k a constant.

Therefore, an ultrashort pulse is made of various spectral components. It is represented in the time domain by its intensity $I(t)$, and in the spectral domain by its intensity $I(\omega)$. After propagation in a dispersive medium, each spectral component sees its phase modified according to the dispersion relation (1.2).

$\beta_0$ and $\beta_1$ have no significant influence on the light pulse ($\beta_1$ corresponds, for example, to a whole time offset related to the passing through the medium). $\beta_2$, or the group-velocity dispersion, describes a propagation that is different for the various spectral components of the pulse. $\beta_3$ corresponds to a higher-order dispersion and is called "third-order dispersion".

$\beta_2$ and $\beta_3$ permit the modelling of the nonlinear effects considered herein. The higher terms of order 4 are afterwards considered as negligible.

In the case of a chirped pulse amplifier, the aimed objective is to maintain, after amplification, the quality of the spectral and temporal phase of the pulses, so that the latter can be compressed.

If the amplifier comprises n elements, the following conditions have thus to be satisfied:

$$\sum_{i=1}^{n} \beta_2^i = 0 \quad (1.5)$$

$$\sum_{i=1}^{n} \beta_3^i = 0 \quad (1.6)$$

Several groups (ref. [3]-[7]) have shown the possibility to take advantage of these nonlinear effects to increase the performance of the CPA systems, by matching the nonlinear dispersions of the various components of the CPA system.

Currently, two types of chirped pulse fiber amplifiers with nonlinear compensation have been published.

A first technique known as "Cubicon" (ref. 4) is based on the amplification of pulses with a strong spectral and temporal asymmetry. Initial pulses coming from an oscillator are temporally stretched in a fiber stretcher and spectrally filtered by a spectral filter, so as to obtain pulses with strongly asymmetric spectral and temporal profiles. The asymmetric pulses are then amplified in a nonlinear fiber amplifier and then compressed by a grating compressor. The self-phase modulation introduced by the amplifying fiber permits the third-order dispersion (TOD) of the compressor to be compensated. However, such spectrally asymmetric pulses induce a loss of spectral bandwidth and the maximal compression is generally limited to pulses of a minimal duration of about 500 fs at the CPA output.

A second technique proposed by Wise (Ref. 5) consists in using the CPA in nonlinear regime, which permits to increase the operation thereof, provided that they are capable to compensate for the nonlinearities introduced during the propagation and amplification in the amplifying fiber and by the dispersions of the stretcher and the compressor;

Wise essentially describes a fiber stretcher-grating compressor configuration in which the nonlinear phase in the amplifying fiber (predominantly of order 2 or 3) can be compensated, taking into account the dispersive fiber stretcher-grating compressor couple used.

However, in the publications (5 to 7), the operating point used (i.e. the peak-energy or power of the pulses) corresponds to a very high nonlinear phase ($17\pi$) in the amplifying fiber.

Nevertheless, such a high value of nonlinear phases ($17\pi$) is probably very close to the threshold beyond which the nonlinear Raman effects become predominant and absorb the greatest part of the pulse energy. The fiber laser may become difficult to use in these conditions.

Further, it is difficult to consider the use of a system based on this structure at very much higher energies, because it would require a longer fiber length (in the stretcher), needing an even higher nonlinear phase for an optimal operation, and more disturbing Raman effects. Accordingly, this device seems to be energy-limited.

In the publications [3]-[4], the CPA is of the optical fiber stretcher and diffraction grating compressor type.

The document L. Kuznetsova et al. (ref. [5]) also uses a fiber stretcher, and clearly indicates that the grating stretchers are not appropriate in this case.

In the publications [2]-[7], a fiber stretcher is still used, for reasons of compactness of the system and easiness of alignment.

A limitation of the prior art CPA systems with nonlinear compensation is that this nonlinear effect compensation is generally obtained for relatively limited energy, with a good quality of pulses (typically a few tens of µJ for pulses of about 200 fs (cf [5-7]) or at higher energies (up to 100 µJ), but with longer pulses (typically >500 fs) and of arguable quality (cf [4]). It is often difficult to extend the use of a type of CPA to higher energies (or peak-powers), while maintaining a satisfying temporal quality. Indeed, to obtain an amplification to higher energies, the stretching factor is increased (by increasing for example the length of the stretcher fiber), which generates more nonlinearities in the amplifying fiber, while increasing the stretching factor. Thus, the extensibility of the CPA system described in the reference [3] to [7] for higher energy domains cannot be applied.

It is known that the nonlinear effects that accumulate in a CPA system are difficult to compensate for, because they depend on very numerous parameters interdependent to each other.

The invention permits to solve these drawbacks and to obtain ultrashort pulses in the femtosecond regime and having a peak-power higher than the megawatt.

A first object of the invention is to propose a chirped pulse amplifier (CPA) system with nonlinear compensation that can be used at high peak-power and energy and mean-power (of the order of one hundred µJ and a few hundreds peak-MW) and that is capable of delivering strongly compressed pulses (100 fs<pulse duration<1 ps).

A second object of the invention is to propose a nonlinear CPA architecture capable of operating over a high energy range and with amplifying fibers of various geometries, in which the second and third-order (nonlinear) dispersions can be adjusted, while remaining far from the conditions in which the Raman effects become deleterious.

According to the invention, a particular configuration of CPA has been determined, which permits to solve the problem of the second and third-order nonlinear compensation, while remaining in a nonlinear propagation domain far from the threshold of the Raman effects.

According to the invention, the CPA system combines a diffraction grating stretcher and a diffraction grating compressor, chosen so as to present a dispersion mismatch. Advantageously, the diffraction grating of the compressor is more dispersive than the diffraction grating of the stretcher. Furthermore, according to the invention, the third-order dispersion of the stretcher permits to apply a temporal asymmetry to the pulse, without introducing a spectral asymmetry. The second-order mismatch between the stretcher and the compressor is sufficiently small to be compensated for by the second-order nonlinear phase in the amplifying fiber and, simultaneously, the third-order mismatch between the stretcher and the compressor is sufficiently small to be compensated for by the third-order nonlinear phase in the amplifying fiber. The nonlinear phase accumulated in the optical fiber amplifier may then be limited in amplitude to values of the order of less than $10\pi$, which places effectively the CPA in a nonlinear propagation regime ($\phi_{NL}>1$), but sufficiently far from the Raman effect thresholds ($\phi_{NL}\sim 10\text{-}20\pi$).

To that end, the invention relates to a chirped pulse fiber amplifier with nonlinear compensation, comprising:
- means for producing a light pulse (10) of initial peak-power $P_0$, initial duration T, and the wavelength of which is centred about a value $\lambda_0$;
- a stretcher suitable for temporally stretching the pulse;
- an amplifying fiber comprising a doped optical fiber section coupled to optical pumping means, and suitable for amplifying the stretched pulse so as to produce a pulse of peak-power P;
- an optical diffraction grating compressor suitable for temporally compressing the amplified pulse;
- the stretcher and the compressor being mismatched, with a mismatch between the second-order dispersions of the stretcher ($\beta_{2E}$) and of the compressor ($\beta_{2C}$) suitable for compensating the second-order nonlinear dispersion ($\beta_{2NL}$) in the amplifying optical fiber during the propagation of a pulse of initial peak-power $P_0$ through the chirped pulse amplifier:

$$\beta_{2E}+\beta_{2NL}+\beta_{2C}=0.$$

According to the invention:
the stretcher comprises at least one optical diffraction grating having a grating line density greater than 1200 lines/mm, and which is suitable for having a coefficient $\beta_3/\beta_2$ lower than $-2.5$ fs at the power $P_0$ and the wavelength $\lambda_0$, so as to introduce a temporal asymmetry in the stretched pulse, and during the propagation of the pulse of initial peak-power $P_0$ through the chirped pulse amplifier, the amplifying fiber (3) has a coefficient of third-order nonlinear dispersion ($\beta_{3NL}$) suitable for compensating the difference between the third-order dispersions of the stretcher ($\beta_{3E}$) and of the compressor ($\beta_{3C}$):

$$\beta_{3E}+\beta_{3NL}+\beta_{3C}=0.$$

According to an embodiment of the invention, the diffraction grating of the compressor has a line density higher than that of the diffraction grating of the stretcher.

Advantageously, the stretcher grating is used with an incidence angle close to the Littrow angle (for which the incidence angle to the grating and the angle of the diffracted beam are the same), at the wavelength $\lambda_0$ of the pulse.

The density of the grating, the wavelength $\lambda_0$ and the incidence angle define the ratio $\beta_3/\beta_2$. The distance between the grating and its image by the optical system of the stretcher defines the value of $\beta_2$ (and thus also that of $\beta_3$).

According to a particular embodiment of the invention, the stretcher comprises a diffraction grating suitable for having a coefficient $\beta_3/\beta_2$ lower than $-2.5$ fs.

According to a particular embodiment of the invention, the diffraction grating of the compressor has a line density higher than that of the stretcher grating and has a coefficient $\beta_3/\beta_2$ lower than $-2.5$ fs.

According to a particular embodiment of the invention, the stretcher comprises at least one diffraction grating having a density at least equal to 1200 lines/mm and lower than the line density of the compressor grating.

According to a particular embodiment of the invention, the compressor comprises at least one diffraction grating having a density higher than 1200 lines/mm.

According to a particular embodiment of the invention, the stretcher comprises a pair of diffraction gratings.

According to a particular embodiment of the invention, the stretcher is of the grism type and comprises at least one dispersive prism.

According to a particular embodiment of the invention, the compressor comprises a pair of diffraction gratings.

According to a particular embodiment of the invention, the compressor is of the grism type and comprises at least one dispersive prism.

According to a particular embodiment of the invention, the amplifying optical fiber is an Ytterbium-doped photonic fiber, with a core diameter greater than 20 µm and a length comprised between 10 cm and a few meters, coupled to optical pumping means.

According to a particular embodiment of the invention, the amplifying fiber (3) comprises several amplifying optical fiber sections arranged in series.

According to a particular embodiment of the invention, the light pulse to be amplified:

is a $TEM_{00}$ pulse;
the wavelength of the pulse is equal to 1050 nm±50 nm,
the duration T of the initial pulse is comprised between 100 fs and 1 ps,
the output mean-power of the amplified pulses is comprised between 1 W and 1 kW, and
the output peak-power of the pulses is comprised between 10 MW and a few gigawatts.

One or more embodiments will be described hereinafter with respect to the appended drawings, so as to illustrate the present invention.

DETAILED DESCRIPTION OF THE INVENTION

In the case of a nonlinear CPA system, the relations 1.5 and 1.6 are expressed as follows:

$$\beta_{2stretcher}+\beta_{2fiber}+\beta_{2NL}+\beta_{2compressor}=0 \quad (1.7)$$

$$\beta_{3stretcher}+\beta_{3fiber}+\beta_{3NL}+\beta_{3compressor}=0 \quad (1.8)$$

In the prior-art nonlinear compensation CPA, the stretcher is made of a very long optical fiber.

The Table hereinafter shows the signs of these different parameters, in the case of a fiber stretcher, used in prior-art CPA systems.

|  | Fiber stretcher | Fiber amplifier | Grating compressor |
| --- | --- | --- | --- |
| $\beta_2$ | >0 | >0 | <0 |
| $\beta_3$ | >0 | >0 | >0 |

In a nonlinear CPA using a fiber stretcher, the combination of a mismatched fiber stretcher and compressor permits the compensation of the second and third-order nonlinear dispersions accumulated in the amplifying fiber. For that purpose, it is necessary to choose stretcher and compressor components such as the second-order mismatch is compensated by that of the fiber, and to adjust the power so that the third-order mismatch between the fiber stretcher and the grating compressor is compensated by the third-order nonlinear phase accumulated in the amplifying fiber.

However, it is observed that, when the second-order mismatch is almost compensated, the third-order mismatch between a fiber stretcher and a grating compressor is great, which requires a compensation at high third-order nonlinear phases (17π in the publication [5]).

On the contrary, according to the invention, the stretcher comprises an optical diffraction grating. Within the framework of the invention, it has been highlighted that a particular CPA architecture according to the invention, based on a diffraction grating stretcher, is not equivalent to a CPA architecture based on an optical fiber. Indeed, the Table hereinafter shows the signs of the different parameters $\beta_2$ and $\beta_3$, in the case of a diffraction grating stretcher, without taking into account the nonlinearities in the amplifier.

|           | Grating stretcher | Fiber amplifier | Diffraction grating compressor |
|-----------|-------------------|-----------------|--------------------------------|
| $\beta_2$ | >0                | >0              | <0                             |
| $\beta_3$ | <0                | >0              | >0                             |

The Table hereinafter shows the orders of magnitude of $\beta_2$ and $\beta_3/\beta_2$ for a few particular cases.

| Component | $\beta_2$ (fs)$^2$ | $\beta_3/\beta_2$ (fs) |
|-----------|--------------------|------------------------|
| Grating stretcher (1750 lines/mm, Littrow configuration, Z ~0.09 m) | 6,560,000 | −15.8 fs |
| Fiber stretcher (L ~400 m) | 6,560,000 | 2.7 fs |
| Fiber amplifier (L ~1 m) | 16,400 | 2.7 fs |
| Grating compressor | −6,560,000 | −15.8 fs |

The nonlinear effects translate into an additional spectral phase, which appears during the amplification in the fiber amplifier, and are mainly due to the self-phase modulation (SPM). This spectral phase may also be decomposed into a Taylor series, according to the parameters $\beta_{2NL}$ and $\beta_{3NL}$.

The parameter $\beta_{2fiber}$, related to the dispersion in the amplifying fiber, is generally very small with respect to the parameters $\beta_2$ of stretcher and the compressor, and may be neglected. It is the same regarding the parameter $\beta_{3fiber}$, and the relations (1.7) and (1.8) may then be written as follows:

$$\beta_{2NL} = -\beta_{2compressor} - \beta_{2stretcher} \quad (1.9)$$

$$\beta_{3NL} = -\beta_{3compressor} - \beta_{3stretcher} \quad (1.10)$$

During the design of a CPA system, using a diffraction grating stretcher and a diffraction grating compressor, it is possible to satisfy the condition (1.9), in particular with gratings having different line densities, and thus different parameters $\beta_3/\beta_2$. Besides, for a given line density in the gratings of the stretcher and the compressor, the parameter $\beta_2$ may also be adjusted by changing the distance between the gratings.

If the condition (1.9) can be satisfied by adjusting the parameters of the stretcher and the compressor (line density of the gratings, distance between the gratings), it is not the same for the condition (1.10). Indeed, the parameters $\beta_{2NL}$ and $\beta_{3NL}$ of the fiber are not independent. Actually, if the condition (1.9) is verified, the parameter $\beta_{3NL}$ of the fiber is generally too small in this case.

To satisfy simultaneously the conditions (1.9) and (1.10), it is then advisable to optimise the ratio $$\left| \frac{\beta_{3NL}}{\beta_{2NL}} \right|$$

of the fiber, as described in the following paragraph.

For a given dispersion, the effect of self-phase modulation on a temporally asymmetric pulse leads to a higher parameter $\beta_{3NL}$, and thus an increase of the ratio $$\frac{\beta_{3NL}}{\beta_{2NL}}.$$

However, according to the invention, in the grating stretcher having an appropriate ratio $\beta_3/\beta_2$, the stretched pulse has a symmetric spectrum, but a temporal asymmetry.

The increase of the ratio $$\frac{\beta_{3NL}}{\beta_{2NL}}$$

is related to the temporal asymmetry of the pulse. The compensation of the non linear effects in the device according to the invention takes place at a given energy-operating point. The process of optimization of the second and third-order compensations is an iterative process at the design of the system.

Within the framework of the invention, it has firstly been shown that the parameter $\beta_{3NL}$ depends not only on the pulse amplitude at the output of the stretcher, but also on the symmetric or asymmetric shape for the temporal profile of this pulse. Actually, as the index $n(\omega)$ depends on the intensity $I(\omega)$, it will depend on the temporal shape of the pulse, thus the phase varies as a function of the pulse shape.

Moreover, the pulse shape evolves during the amplification in the fiber.

According to the invention, it has then been shown that the grating stretcher has the property of making a pulse more temporally asymmetric than a fiber stretcher, without necessarily introducing a spectral asymmetry.

A temporally asymmetric pulse can be obtained when a Fourier-transform-limited ultrashort pulse is subjected to the joint effect of the group-velocity dispersion and the third-order dispersion.

It is to be noted that, in the case of a fiber stretcher, the ratio $$\left| \frac{\beta_3}{\beta_2} \right|$$

is smaller than that of a grating stretcher with a line density higher than 1200 lines/mm used close to the Littrow incidence angle. In this case, if the spectrum is symmetric, the ultrashort pulse is stretched, but remains almost symmetric. To obtain a temporally asymmetric shape with a fiber stretcher, it is necessary to stretch an asymmetrical spectrum pulse or to make the spectrum asymmetric after stretching, for example by means of a filter (ref. 4). This technique leads to a cutting of the pulse spectrum, and thus to a limitation on the minimal duration of the compressed pulse.

For a same dispersion, a fiber stretcher will therefore introduce far less third-order dispersion than a grating stretcher. The nonlinear effects used for the compensation of the third-order dispersion increase with the intensity of the amplified light pulse. The compensation of the third-order dispersion by the non linear effects in the fiber will thus be made at a lesser intensity level for a fiber stretcher than for a grating stretcher.

For a given dispersion, a CPA system according to the invention with a diffraction grating stretcher permits the compensation of the nonlinear effects at a higher energy than with a CPA system comprising an optical fiber stretcher.

Figure 1:
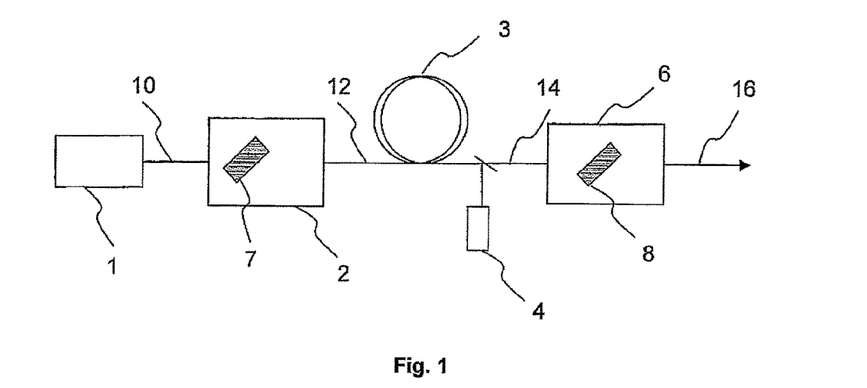
FIG. 1 schematically shows a chirped pulse amplifier system according to the invention.
Figure 2:
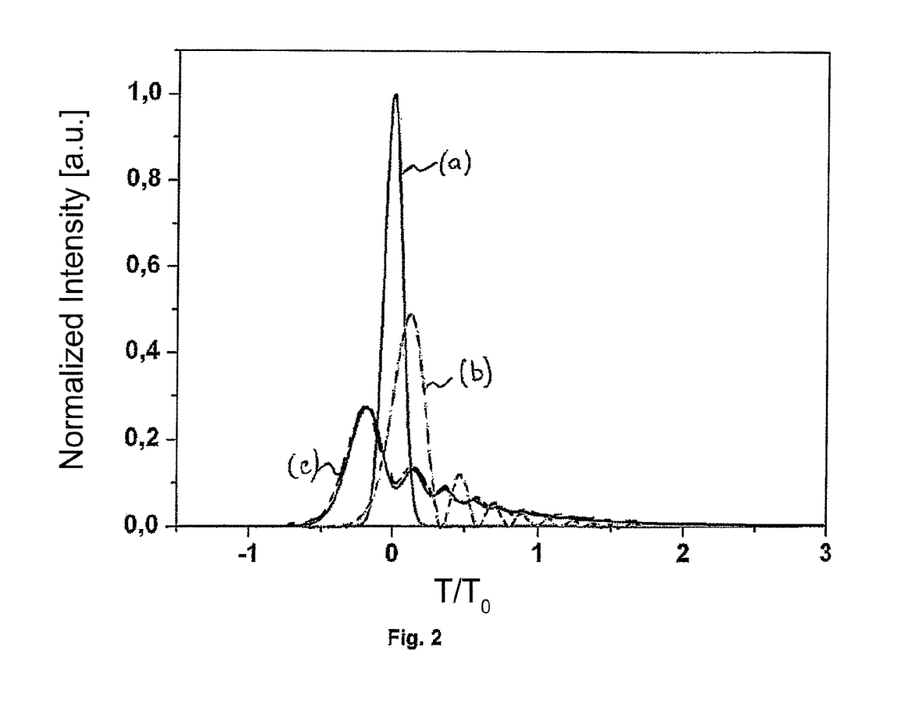
FIG. 2 shows the second and third-order nonlinear effects on an ultrashort pulse (solid line (a)), after propagation in a medium having, respectively, only a third-order dispersion (dotted line (b)) and jointly a group-velocity and third-order dispersion (pecked line (c))

FIG. 1 describes a chirped pulse amplifier system with nonlinear compensation according to the preferred embodiment of the invention.

The pulse to be amplified (10) comes from an Ytterbium femtosecond oscillator (5), delivering Fourier-limited pulses, at a central wavelength of 1030 nm, with an energy higher than 20 nJ, at a frequency of 50 MHz. The pulse duration is of about 100 fs, and the spectral width of 11.2 nm. If necessary, the repetition rate may then be reduced in a pulse selector, using an acousto-optic modulator.

The stretcher (2) uses a pair of transmission diffraction gratings (7), having a pitch of 1500 lines/mm, at an angle close to the Littrow angle. For an equivalent distance between gratings of about 10 cm, the initial pulse is stretched to a duration of about 130 ps, at half-maximum. This value is not imitative and depends on the condition of the system. It may vary between 1 ps and 2 ns.

Figure 3:
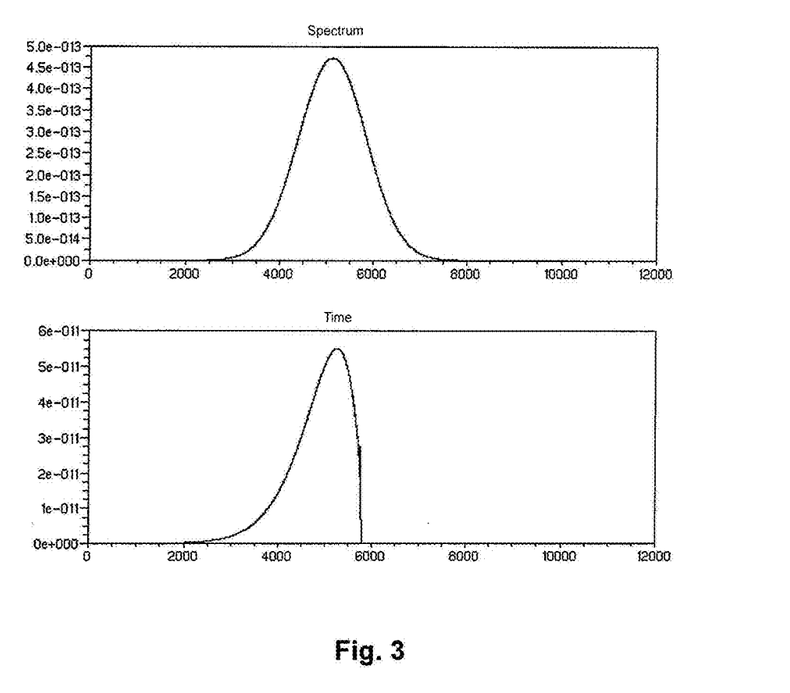
FIG. 3 shows the effect of an optical diffraction grating stretcher on, respectively, the spectral distribution (top diagram) and the time distribution of a pulse having initially symmetric spectral and time distributions.

After the stretcher (2), it is important to note that the temporal shape of the pulse is no longer symmetric, because of the third-order dispersion induced in the stretcher (cf. FIG. 3).

Figure 4:
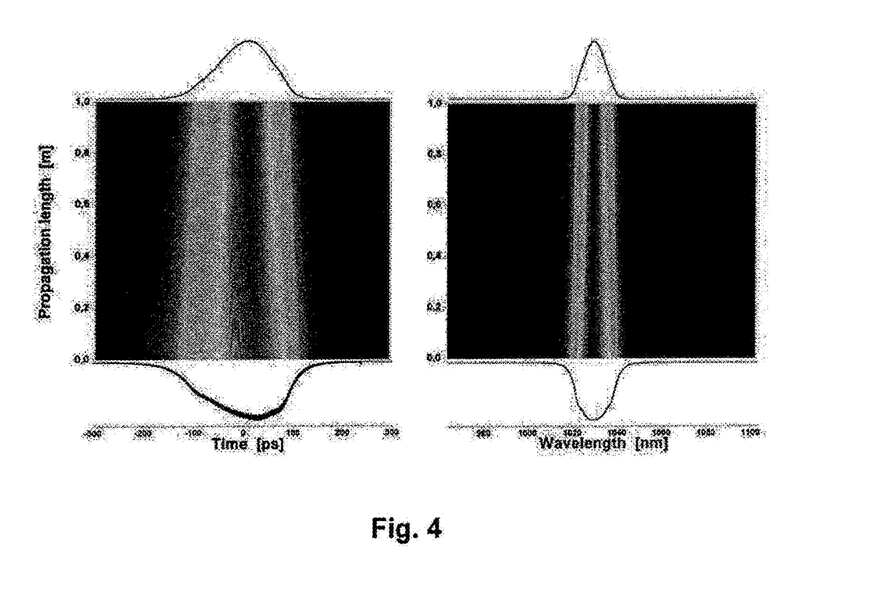
FIG. 4 shows the propagation of a pulse that is stretched and applied with a temporal asymmetry through an amplifying optical fiber.

The amplification then takes place in a photonic fiber (3) having a large core diameter, typically 80 nm (mode diameter of about 70 μm), pumped by a fibered laser diode (4) emitting at 976 nm. The amplified energy (14) is of about 100 μJ. Such a fiber has a relatively small nonlinearity ($\gamma \sim 5 \cdot 10^{-5}$ W$^{-1} \cdot$m$^{-1}$). However, because of the high energy, the nonlinear effects, and notably the self-phase modulation, must be taken into account. The self-phase modulation, acting on a temporally asymmetric shaped pulse, is thus the main factor leading to the temporal compensation after compression (cf. FIG. 4).

Figure 5:
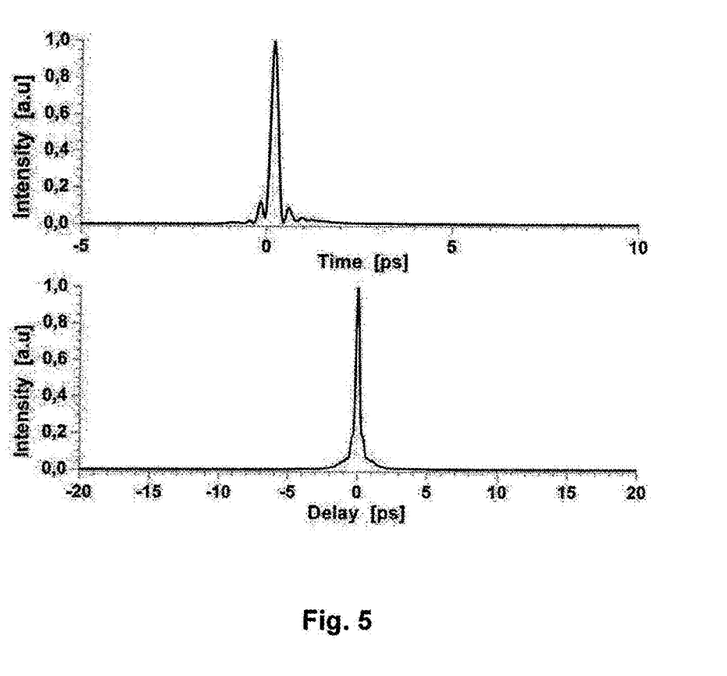
FIG. 5 shows the result of a simulation of the propagation of a light pulse in a system according to the invention, with a simultaneous compensation of the second and third-order distortions.

The amplified pulse (14) is then recompressed in a compressor (6) with optical diffraction grating (8), using also a pair of transmission diffraction gratings under an incidence close to the Littrow angle, with a line density of 1750 lines per mm. The compression efficiency is generally higher than 70% (cf. FIG. 5, the auto-correlation function of the output pulse).

The output amplified pulse (cf. FIG. 5) does not have any nonlinear distortion producing second-order nor third-order rebounds.

For more flexibility in the system design, it is possible to replace the gratings (7) of the stretcher by a hybrid configuration using gratings and prisms (or grism). Such a configuration permits an easier independent adjustment of the parameters $\beta_2$ and $\beta_3$ of the stretcher.

To sum up, the invention relates to a source of high-power ultrashort light pulses. It uses a CPA-type architecture, comprising an optical diffraction grating stretcher, a doped fiber amplifier and an optical diffraction grating compressor. This architecture is optimized so that the nonlinear effects in the optical fiber compensate the residual terms of second-order and third-order phase shift. It permits the use of a symmetric spectrum, and the temporal asymmetry necessary for the compensation is naturally produced in the stretcher. It does not implement a spectral filtering technique, which limits the minimal duration of the compressed pulse. It may also use the technique of amplification beyond the gain bandwidth described in [9] D. Papadopoulos et al. "Generation of 63 fs 4.1 MW peak power pulses from a parabolic fiber amplifier operated beyond the gain bandwidth limit", Opt. Lett. 32, 2520-2522 (2007).

With respect to the techniques described in ref. 3-7, which use a fiber stretcher, the invention permits to amplify pulses of higher incident energy, which can be advantageous in certain configurations. It presents a greater flexibility because of the variation to some extent of the third and second-order dispersions in the grating stretcher and the grating compressor. Such flexibility may be further increased by the use of hybrid techniques of the "grism" type ([8] Y. Zaouter et al. "Third-order spectral phase compensation in parabolic pulse compression", Opt. Express 15, 9372-9377 (2007)).

The invention uses the nonlinear effects to obtain greater energies than with a fiber stretcher.

The use of a diffraction grating stretcher in the nonlinear CPA system of the invention does not substantially increase the whole bulkiness of the system. Indeed, the whole compactness of a CPA system is limited by the compactness of the diffraction grating compressor, used in all the systems. Besides, the alignment of the diffraction grating compressor being known by the one skilled in the art, the alignment of a diffraction grating stretcher does not pose any additional difficulty.

The invention claimed is:

1. Chirped pulse fiber amplifier (1) with nonlinear compensation, comprising:
    a first element that outputs a light pulse (10) of initial peak-power $P_0$, initial duration T, and the wavelength of which is centred about a value $\lambda_0$;
    a stretcher (2) suitable for temporally stretching the pulse (10);
    an amplifying fiber (3) comprising a doped optical fiber section coupled to optical pumping means (4), and suitable for amplifying the stretched pulse (12) so as to produce a pulse of peak-power P;
    an optical diffraction grating compressor (6) suitable for temporally compressing the amplified pulse (14);
    the stretcher (2) and the compressor (6) being mismatched, with a mismatch between the second-order dispersions of the stretcher ($\beta_{2E}$) and of the compressor ($\beta_{2C}$) suitable for compensating the second-order nonlinear dispersion ($\beta_{2NL}$) in the amplifying optical fiber (3) during the propagation of a pulse of initial peak-power $P_0$ through the chirped pulse amplifier:

$$\beta_{2E} + \beta_{2NL} + \beta_{2C} = 0$$

and characterized in that:
    the stretcher (2) comprises at least one optical diffraction grating (7), having a grating line density greater than 1200 lines/mm, and which is suitable for having a coefficient $\beta_3/\beta_2$ lower than −2.5 fs at the power $P_0$ and the wavelength $\lambda_0$, so as to introduce a temporal asymmetry in the stretched pulse, and
    in that, during the propagation of the pulse of initial peak-power $P_0$ through the chirped pulse amplifier, the amplifying fiber (3) has a coefficient of third-order nonlinear dispersion ($\beta_{3NL}$) suitable for compensating the difference between the third-order dispersions of the stretcher ($\beta_{3E}$) and of the compressor ($\beta_{3C}$):

$$\beta_{3E} + \beta_{3NL} + \beta_{3C} = 0.$$

2. Fiber amplifier (1) according to claim 1, characterized in that: the diffraction grating (8) of the compressor (6) has a line density higher than that of the grating (7) of the stretcher (2).

3. Fiber amplifier according to claim 1, characterized in that: the compressor (6) comprises at least one diffraction grating (8) having a line density higher than 1200 lines/mm.

4. Fiber amplifier according to claim 1, characterized in that: the stretcher (2) comprises at least one diffraction grating (7) having a density at least equal to 1200 lines/mm and lower than the line density of the compressor grating.

5. Fiber amplifier according to claim 1, characterized in that: the stretcher (2) comprises a pair of diffraction gratings.

6. Fiber amplifier according to claim 1, characterized in that: the stretcher (2) is of the grism type and comprises at least one dispersive prism.

7. Fiber amplifier according to claim 1, characterized in that: the compressor (6) comprises a pair of diffraction gratings (8).

8. Fiber amplifier according to claim 1, characterized in that: the compressor (6) is of the grism type and comprises at least one dispersive prism.

9. Fiber amplifier according to claim 1, characterized in that: the amplifying optical fiber (3) is an Ytterbium-doped fiber, with a core diameter greater than 20 µm and a length comprised between 10 cm and a few meters, coupled to optical pumping means.

10. Fiber amplifier according to claim 1, characterized in that: the amplifying fiber (3) comprises several amplifying optical fiber sections arranged in series.

11. Fiber amplifier according to claim 1, characterized in that:
the initial pulse is a $TEM_{00}$ pulse,
the wavelength of the pulse is equal to 1050 nm±50 nm,
the duration T of the initial pulse is comprised between 100 fs and 1 ps,
the output mean-power of the amplified pulses is comprised between 1 W and 1 kW, and
the output peak-power of the pulses is comprised between 10 MW and a few gigawatts.

12. Fiber amplifier according to claim 2, characterized in that: the compressor (6) comprises at least one diffraction grating (8) having a line density higher than 1200 lines/mm.

13. Fiber amplifier according to claim 2, characterized in that: the stretcher (2) comprises at least one diffraction grating (7) having a density at least equal to 1200 lines/mm and lower than the line density of the compressor grating.

14. Fiber amplifier according to claim 3, characterized in that: the stretcher (2) comprises at least one diffraction grating (7) having a density at least equal to 1200 lines/mm and lower than the line density of the compressor grating.

15. Fiber amplifier according to claim 2, characterized in that: the stretcher (2) comprises a pair of diffraction gratings.

16. Fiber amplifier according to claim 2, characterized in that: the stretcher (2) is of the grism type and comprises at least one dispersive prism.

17. Fiber amplifier according to claim 2, characterized in that: the compressor (6) comprises a pair of diffraction gratings (8).

18. Fiber amplifier according to claim 2, characterized in that: the compressor (6) is of the grism type and comprises at least one dispersive prism.

19. Fiber amplifier according to claim 1, wherein, the first element that outputs the light pulse (10) of initial peak-power P0, initial duration T, and the wavelength of which is centred about the value λ0 is an Ytterbium femtosecond oscillator.

20. Fiber amplifier according to claim 1, wherein, the first element that outputs the light pulse (10) of initial peak-power P0, initial duration T, and the wavelength of which is centred about the value λ0 is an oscillator.

* * * * *